(12) United States Patent
Grohman

(10) Patent No.: US 9,441,847 B2
(45) Date of Patent: Sep. 13, 2016

(54) SYSTEM FOR CONTROLLING HVAC AND LIGHTING FUNCTIONALITY

(71) Applicant: Wojciech Maciej Grohman, Little Elm, TX (US)

(72) Inventor: Wojciech Maciej Grohman, Little Elm, TX (US)

( * ) Notice: Subject to any disclaimer, the term of this patent is extended or adjusted under 35 U.S.C. 154(b) by 421 days.

(21) Appl. No.: 13/815,508

(22) Filed: Mar. 7, 2013

(65) Prior Publication Data

US 2013/0245837 A1 Sep. 19, 2013

Related U.S. Application Data

(60) Provisional application No. 61/685,505, filed on Mar. 19, 2012.

(51) Int. Cl.
| | |
|---|---|
| G05D 23/19 | (2006.01) |
| F24F 11/00 | (2006.01) |
| G05B 15/02 | (2006.01) |
| G05B 15/00 | (2006.01) |

(52) U.S. Cl.
CPC ........... *F24F 11/0034* (2013.01); *G05B 15/00* (2013.01); *G05B 15/02* (2013.01); *F24F 2011/0064* (2013.01); *F24F 2011/0075* (2013.01)

(58) Field of Classification Search
None
See application file for complete search history.

(56) References Cited

U.S. PATENT DOCUMENTS

| | | | | |
|---|---|---|---|---|
| 5,829,674 | A * | 11/1998 | Vanostrand et al. | 236/49.3 |
| 7,307,542 | B1 * | 12/2007 | Chandler et al. | 340/9.16 |
| 2002/0069063 | A1 * | 6/2002 | Buchner et al. | 704/270 |
| 2006/0023693 | A1 * | 2/2006 | Aso et al. | 370/351 |
| 2007/0046232 | A1 * | 3/2007 | Mullet et al. | 318/280 |
| 2008/0088462 | A1 * | 4/2008 | Breed | 340/573.1 |
| 2009/0112602 | A1 * | 4/2009 | Alfred et al. | 704/273 |
| 2010/0145479 | A1 * | 6/2010 | Griffiths | 700/17 |
| 2010/0235004 | A1 * | 9/2010 | Thind | 700/277 |
| 2011/0199004 | A1 * | 8/2011 | Henig et al. | 315/152 |
| 2012/0153868 | A1 * | 6/2012 | Gu et al. | 315/307 |
| 2012/0274859 | A1 * | 11/2012 | Knutson et al. | 348/723 |

* cited by examiner

*Primary Examiner* — Sean Shechtman
(74) *Attorney, Agent, or Firm* — Scott T. Griggs; Griggs Bergen LLP

(57) ABSTRACT

A system for automatic setup and control of Lighting, Heating Ventilation and Air Conditioning systems comprising a set of occupancy detectors and at least one controller where the controller determines various aspects of the building control based on the input of the occupancy detectors.

28 Claims, 5 Drawing Sheets

SYSTEM FOR CONTROLLING HVAC AND LIGHTING FUNCTIONALITY

RELATED APPLICATIONS

This application claims benefit of and priority to Provisional Patent Application No. 61/685,505, filed Mar. 19, 2012, incorporated by reference herein.

TECHNICAL FIELD

This application is directed, in general, to systems and methods for managing operation of lighting, automatic shade and window control and heating, ventilation and air conditioning systems.

BACKGROUND

Most of today's buildings are lit up, and uniformly conditioned regardless of the state of occupancy in each part of the building. The modern occupancy control systems try to address the issue by allowing controlling of conditioning in only the rooms that are occupied. These systems allow for certain potential energy savings or improved comfort for building occupants, however their installation is costly and rarely do the energy savings realized from using the systems cover the cost of their installation. To be truly effective, a system has to be as inexpensive as possible, while providing high quality intelligent control.

The cost of installation of building control systems includes cost of the equipment as well as the time and labor involved in the physical installation. While the cost of the equipment can be controlled, the time and labor are often unpredictable as they can vary significantly from one building to another. These labor-related costs are the primary driver of the total system installation cost for many buildings. These systems often require professional installation where a trained technician first installs then configures and tests the system. Complexity of such installation adds significantly to the overall cost of the system deployment. Likewise the maintenance of a complicated system requires additional labor further adding to the total cost of ownership for the system.

The invention disclosed here aims to reduce the total cost of ownership of a building's light, shade and HVAC control system. It takes advantage of the algorithms described herein to ensure that the installation and maintenance are as non-labor intensive as possible. The algorithms serve to allow the installers to simply mount the sensors in any controller area of the building and power them up, with the system then guiding the other aspects of installation and service and allowing for its seamless control.

The disclosed system's operation takes advantage of adaptive algorithms that learn specific human behaviors from the input of various controls and sensors in the building. These sensors normally include occupancy sensors, as well as door sensors, locks, building alarm consoles, people's smart phones, etc.

SUMMARY

One embodiment includes a system which self-learns where the points of entry to the building are.

Another embodiment involves the system self-learning where different rooms of the building are, including the bedrooms, kitchens, bathrooms, utility rooms.

One more embodiment includes the system generating and storing behavioral profiles for building occupants and using the behavioral models in system control.

Yet another embodiment involves the use of configuration panel of occupancy detectors to facilitate easier system installation.

Another embodiment involves the system calculating the spatial model of the building and using the model to understand the occupants' behavior inside of the building.

Yet another embodiment has the system actuating system outputs based on the anticipated behavior of building occupants, as derived from their past behavior and modeled in the system's behavioral model.

One more embodiment is a method of installation of the building management system including various occupancy detectors involving walking through the building.

Another embodiment involves the use of a smart device application when walking through the building to facilitate the system configuration during system commissioning.

BRIEF DESCRIPTION

Reference is now made to the following descriptions taken in conjunction with the accompanying drawings, in which.

Figure 3:
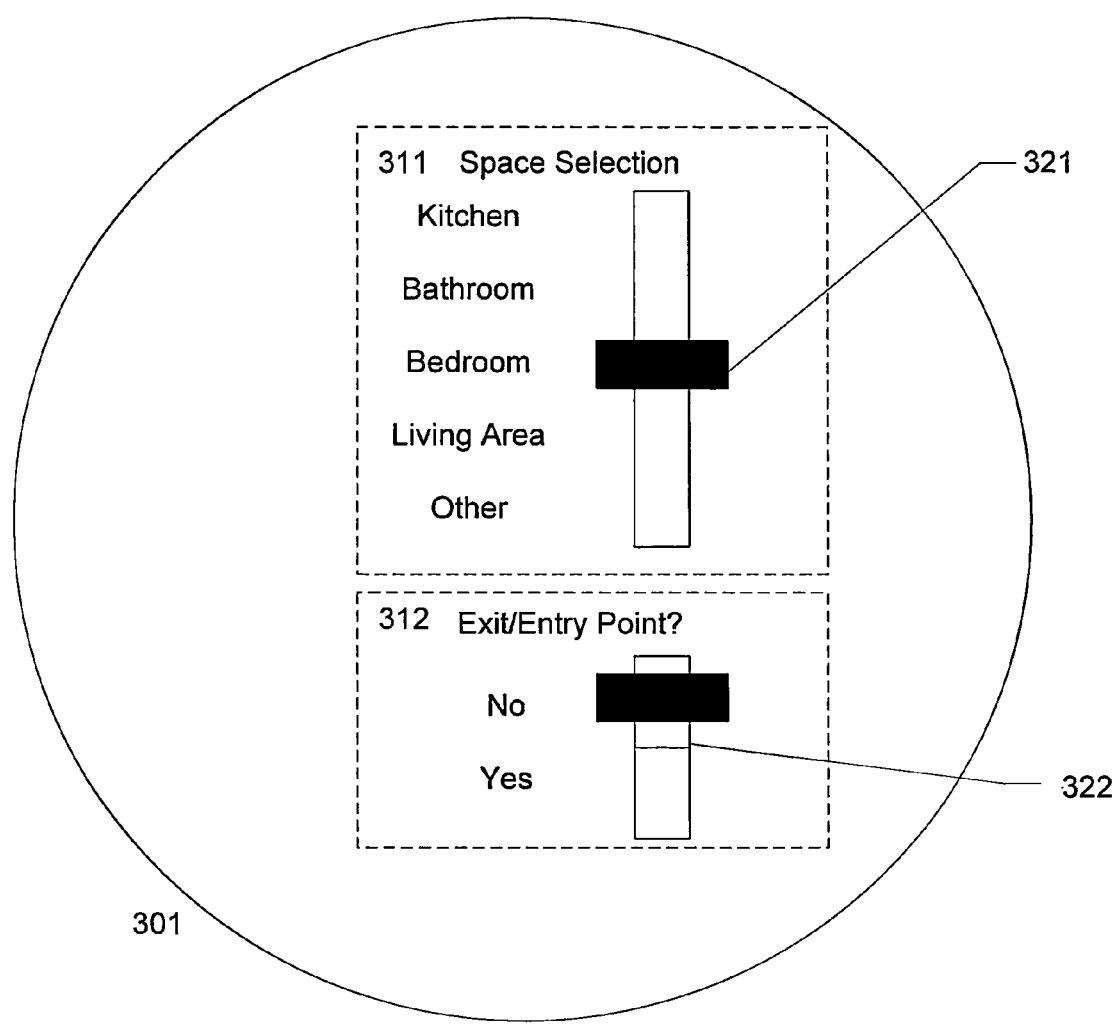
Figure 4:
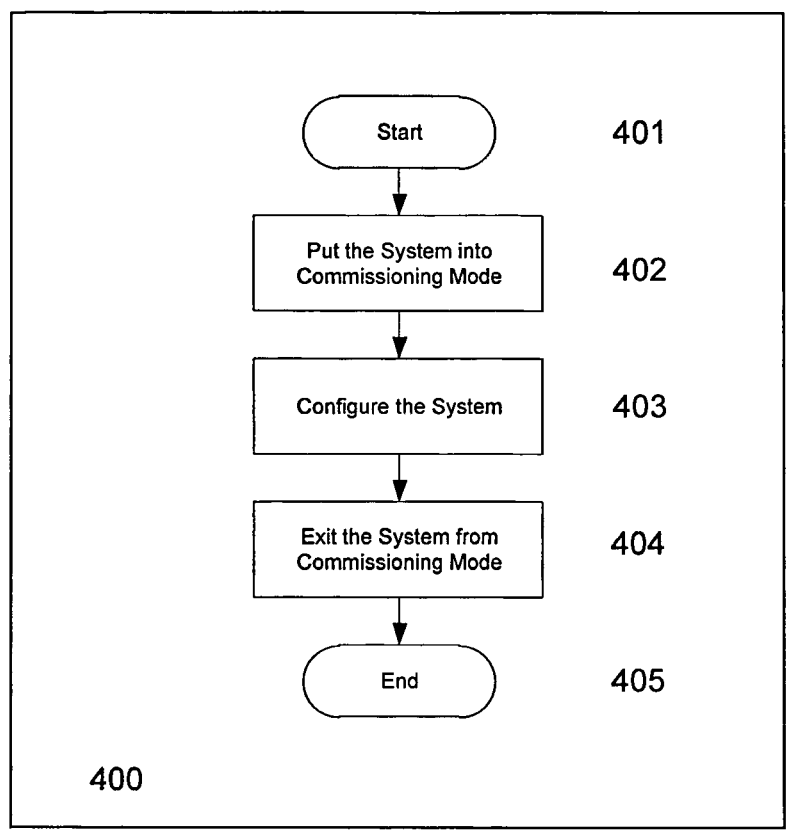
Figure 5:
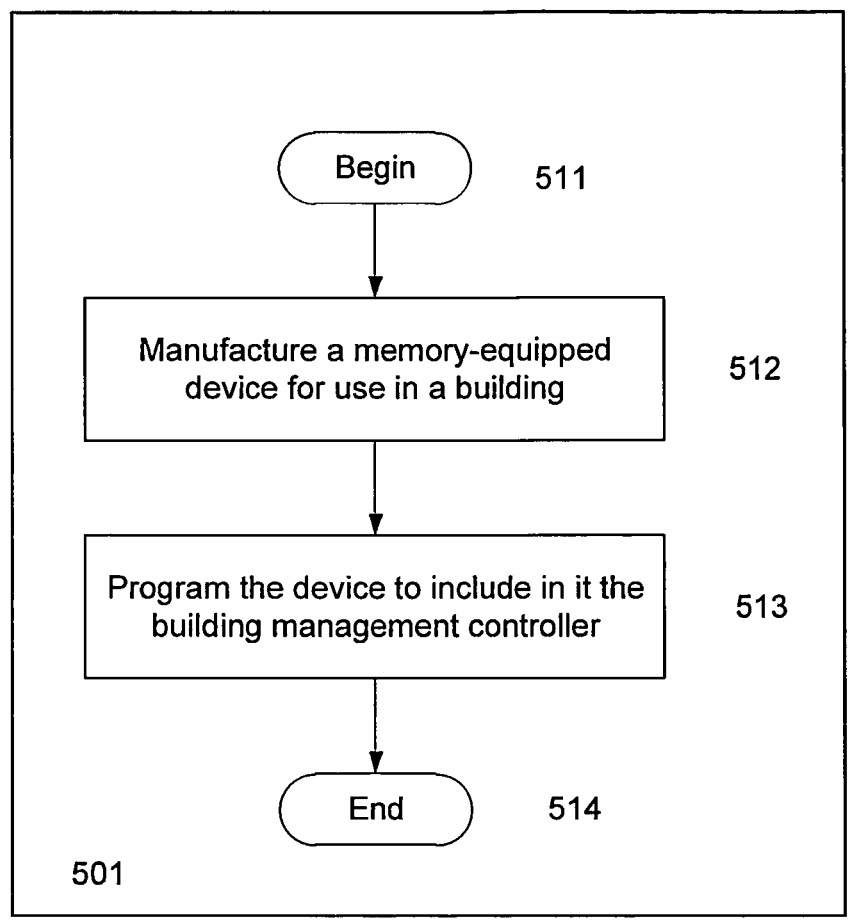

FIG. 3 presents an example configuration panel of an occupancy sensor;

FIG. 4 illustrates the system commissioning method;

FIG. 5 shows a method of the disclosure, for manufacturing of the system controller.

DETAILED DESCRIPTION

Figure 1:
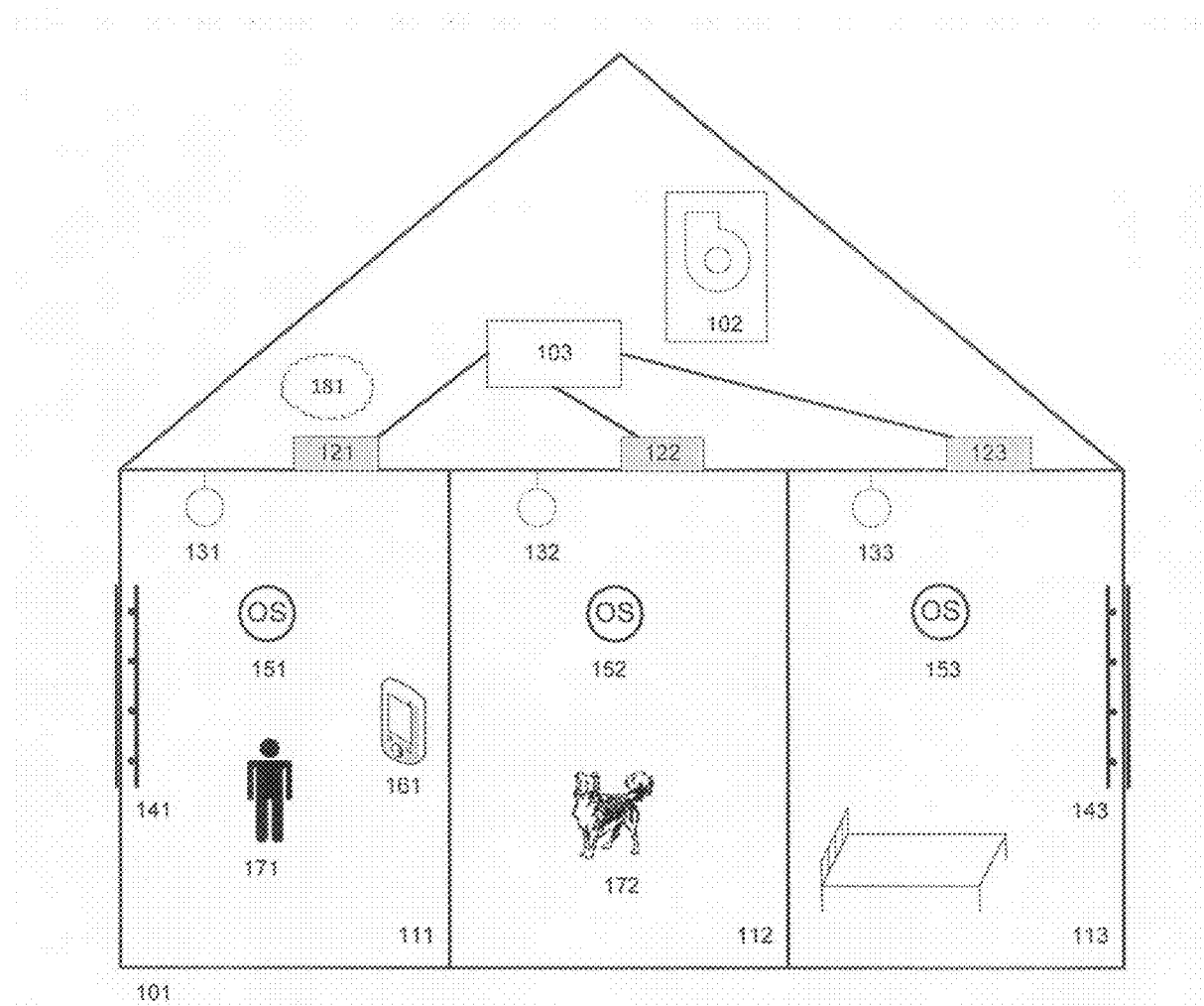
FIG. 1 illustrates one illustrative and non-limiting embodiment of a building control system system with various components.

The FIG. 1 illustrates an embodiment of a system of the disclosure in a building 101. The building is equipped with the furnace 102 and/or other HVAC conditioning equipment, as well as the zoning panel 103 controlling conditioning in various rooms. The building contains different rooms or building zones 111, 112, and 113. In the illustrative non-limiting embodiment room 112 is a kitchen and room 113 is a bedroom. Shown are air vents or dampers 121, 122, and 123, corresponding to the respective room numbers 111, 112, and 113. Likewise, shown are light fixtures 131, 132, 133 and shade controllers 141 and 143.

Further shown are the occupancy sensors 151, 152, and 153. These are often battery powered and wireless to lower the installation and maintenance costs. A system user interface 161 facilitates the input to the system controller 181. The user interface is used to interact with the system and could be a shared resource with another control system in the building, such as an alarm system, HVAC system, entertainment system, a gaming console, etc.

The system controller 181 can be a physical or a virtual device. As a physical device its sole purpose is to control the building. As a virtual device it is embedded into a physical device that performs another independent function. In either case, the system controller 181 connects to other system devices via a network or a combination of networks. The networks can be wireless or wired, or a combination of both. The system controller is defined as a program running on a physical device whose purpose is to control the output actuators of the system based on the input received from system's sensors and other systems it directly or indirectly communicates with.

The dampers 121, 122, 123, the shade controllers 141 and 143, as well as the lights 131, 132, and 133 are considered example system output actuators as their activity is a direct result of the system's algorithms and human interaction. There are many different types of system output actuators—in general, they are any type of a device that affects the state of a defined space (e.g. a room) in any way. Further examples of system output actuators can be heaters, humidifiers, active sound dampeners, entertainment system speakers, etc.

The system differentiates between a person 171 and a pet 172 based on learned behavioral patterns. Specifically, the presence of a pet is detected when for a defined period of time no human activity is detected within the building, but a motion is sensed at the same time. Human activity can be identified by any of or the combination of the following: detected correct interaction with a user interface to the system, detection of turning on or off a TV or computer or a computing device, turning on the stove or a microwave, sound of human voice, human coughing, yawning or sneezing detected inside of the building, thermal imaging detection of a human-sized body, camera recognition of a human, etc.

Conversely, the presence of a pet is identified by the detection of the animal sound such as barking or meowing when no TV, computer, a radio, or any other sound source is turned on in the sound's vicinity. A presence of a pet can also be detected when no other people are detected in the building and there is no intelligent response to system queries. In a non-limiting example embodiment, a user interface associated with the system may prompt the user to interact with it by producing audible or visual signs. No response to the system queries in a defined period of time may be indicative of a pet present in the building.

Naturally, a building can be occupied by a number of humans and a number of pets. The system learns who the occupants are by storing the continuously comparing the behavioral patterns of the building's inhabitants. The system thus learns how many pet and human occupants there are in the building. The system may distinguish different people by determining patterns of their schedule and room occupancy. In a non-limiting example of a general rule, a person may be identified by its weekly schedule and occupancy pattern of different bedrooms at night or living or utility rooms during the day. Specifically, a person may be distinguished by a specific departure and arrival schedule and likelihood of spending certain minimum time in an area of the building during the day and another, possibly different area of the building during the night.

There are many embodiments of the invention that aid the system in self-learning and self configuration. One embodiment includes a system which self-learns where the points of entry to the building are. For a house, the rooms that see the last activity during the day (e.g. in the morning Monday through Friday) are identified as points of entry rooms. The activity in the house may start when a person enters the point of entry room. Blinds are open in the summer when the person enters the house and it is still light outside. Blinds are closed in the summer when the last person leaves the house or when it is dark outside. Lighting level is intelligently adjusted, so that the light coming from the artificial light sources, combined with natural light result in the desired illumination of the occupied rooms.

An additional embodiment provides a system which self-learns where the points of entry to the building are. For a commercial building, the rooms that see the first activity during the day (e.g. in the morning Monday through Friday) are identified as points of entry rooms. The activity in the building is started when a person enters the point of entry room. Blinds are open in the summer when the person enters the building and it is light outside. Blinds are closed in the summer when the last person leaves the building.

Yet another embodiment provides a system which self-learns where the bedrooms are. The bedrooms are the rooms where the people are last active during the evening (last event before no activity is present at night). These could optionally be the identified subset of rooms minus the points of entry to the house. Occupied bedrooms (those who saw activity during the evening) may be conditioned at night, the other rooms may not be.

One more embodiment provides a system which self-learns where the bedrooms are. The bedrooms are the rooms where the people are active first during the morning (first event after no activity is present at night). These could optionally be the identified subset minus the points of entry to the house. Occupied bedrooms (those who saw activity during the morning) are conditioned at night, the other rooms may not be.

Another embodiment provides a system which self-learns where the kitchen is. Kitchen is identified by the loudest sound of cooking received by the system's microphones, highest temperature rise relative to other rooms, highest level of relative humidity, highest detected level of occupancy (most people detected) right after coming back from work or just before leaving for work, or a combination of any or all of these.

One more embodiment provides a system which turns off the light when no person is detected present and identifies the bedrooms by the rooms where the person turns off the lights at night. The last room to have the lights turned off that is not the entry point to the building is the bedroom.

Another embodiment provides a system which turns off the light when no person is detected present and identifies the bedrooms by the rooms where the person turns on the lights at night. The first light turned on in the morning in a room with no prior activity identifies a bedroom.

Yet another embodiment provides a system which is specially programmed and told where the bedrooms are (sensors in the bedrooms are labeled as such and thus their respective room's conditioning is not turned off at night). Optionally, the system is further programmed to know where the bathrooms, living rooms and the kitchens are.

An additional embodiment is a system which is specially programmed to know that there are pets in the building and optionally what rooms they reside in/have access to.

One more embodiment is a system which has a separate level of comfort defined for household pets. E.g. the conditioning is reduced from the level comfortable for humans.

In another embodiment, the system further detects the rooms where the TVs are. The rooms with TVs are still conditioned as long as the TV is turned on. This assumes the system's knowledge of the state of the TV unit. This can be accomplished by the line current monitoring of the TV or wireless communication monitoring between the TV and the user's remote. Alternatively, the sound of TV can be correlated by the system to the known currently running TV programming and matched against it. Yet another possibility is for the system to tie in with the streaming media or entertainment controller and retrieve activity information that allows to determine whether the system is in live use or not.

One more embodiment has the system detecting the presence of household pets when the occupancy detectors indicate movement but nobody interacts with the system via the local user interface for a prolonged period of time (e.g. even when prompted by the UI, there is no response).

In an additional embodiment the system detects presence of household pets when the occupancy detectors indicate movement and the microphone sensors recognize pet sound such as dog barking, cat meowing, etc.

Yet another embodiment provides a system that detects presence of persons in the building by sensing their smartphones being connected to the home router (e.g. via WiFi and appropriate protocols, such as DHCP, Apple's Bonjour, etc.). In one such embodiment the smartphones are optionally periodically queried over the home local wireless connection (e.g within the local network subnet) and their response within a timeout window indicates that they are in fact connected locally to the wireless network.

One more embodiment includes a system that detects the presence of people in the home by monitoring the indoor water faucets where the actuation or deactivation of the faucet indicates a presence of a person in the room (kitchen, bathroom, game room, laundry room, etc.) that the faucet is located in.

One additional embodiment provides a system that self-learns to identify the room as either bathroom, kitchen, laundry room, or game room with the wet bar by the simultaneous presence of a person as indicated by the occupancy detector and the water faucet activation or deactivation (turning on or off).

The information about detected occupants of the building controlled by the system is optionally presented back to the building's occupants or the building operators to allow them to make appropriate corrections on the number and type of detected people or animals in the building. For example, if the system detects two people and two pets—one dog and one cat, where in reality there only are two people and a dog, the system is adjusted to make this correction. System thus learns from any type of interaction with the humans, either implicit through the inferred detection from the system's sensors, or explicit, by the data entered to it via the system's user interface.

Figure 2:
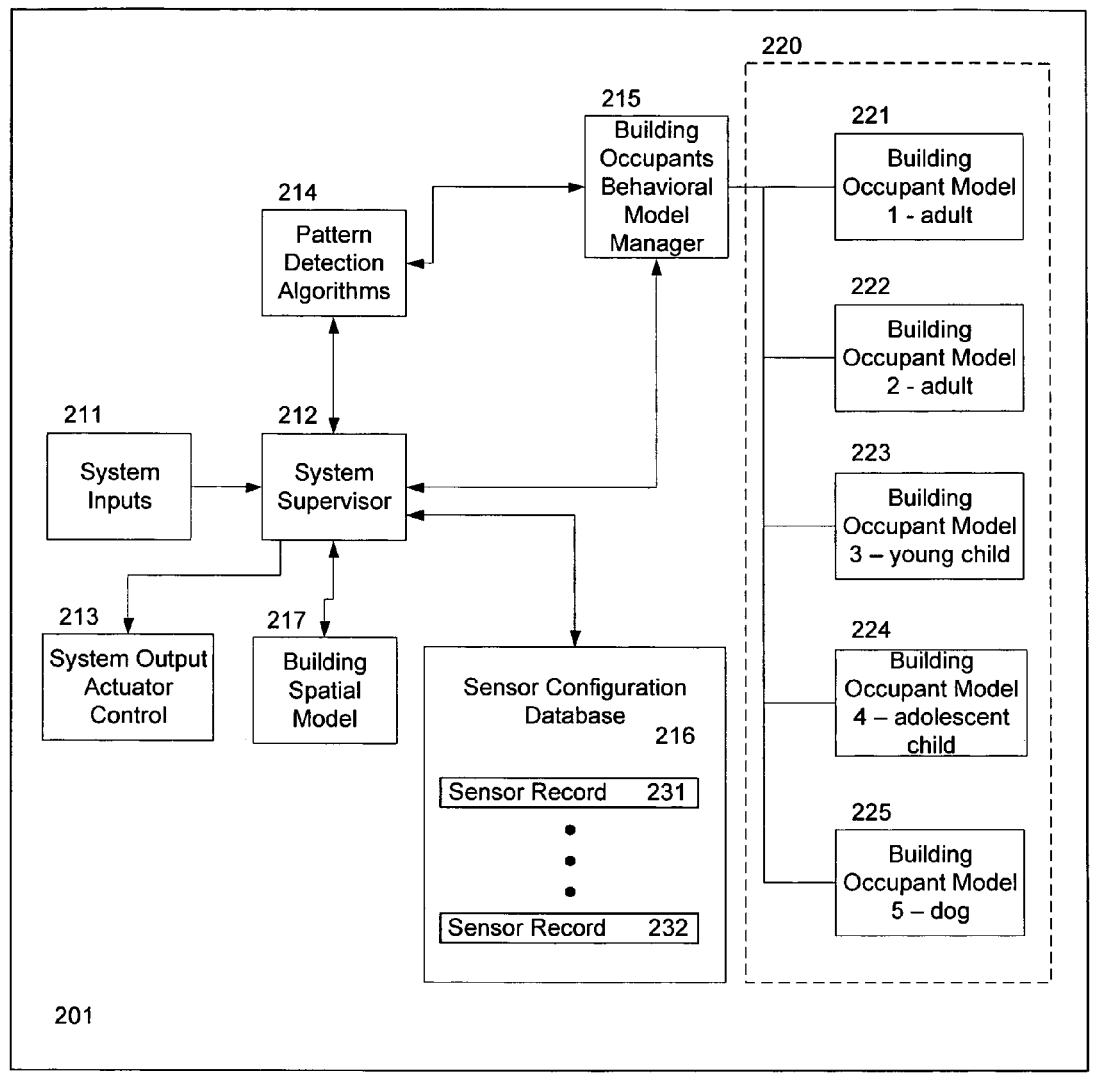
FIG. 2 shows an example logical model embodiment of the invention.

FIG. 2 shows a simplified logical block diagram of the building occupancy system 201. The system is comprised of system inputs 211, system supervisor 212, system output actuator control 213, pattern detection algorithms 214, the building occupants' behavioral model manager 215, the sensor database 216, and the building spatial model 217. In the illustrated non-limiting example, the sensor database contains data on two sensors stored in sensor records 231 and 232 and the building occupants' behavioral model contains profiles of 5 building occupants 221, 222, 223, 224, and 225, stored in a memory 220 associated with the system. It is obvious to those skilled in the art that both the sensor database 216 and the building spatial model 217 themselves are stored in a memory associated with the system (not shown), which may be identical to memory 220 or completely separate from it. In general, all system components can be stored in the same memory, or in many different memories, as long as they are all associated with the system.

The system works by monitoring the data provided by the system inputs 211 to affect the operation of the system outputs via the system output actuator control 213. The system inputs could be physical sensors directly or indirectly coupled into the system. They are considered inputs as long as their data is accessible by the system. The system output actuator control 213 works to control the output of all output actuators that are associated with the system.

The building occupants' behavioral model manager 215 is continuously engaged to modify the models 221, 222, 223, 224, and 225 as the system's understanding of the detected building occupants change. When more occupants are positively identified by one of the pattern detection algorithms 214, new occupant model instances are generated in memory 220. When an occupant is no longer detected for a prolonged period of time, its model is removed from memory 220. It may still be backed up by the system in another location for future use, but it is usually no longer engaged in real time.

System, via the building occupants' behavioral model manager 215, periodically updates the occupant's behavioral pattern models as the behavioral patterns of the building occupants change. These behavioral pattern model updates are triggered by any new behavior detected that does not fit currently used system behavioral model.

Likewise, the system constantly updates its understanding of the state and location of the sensor occupancy sensors in the Sensor Configuration Database 216 based on the data from all system inputs 211.

The building occupants' behavioral model manager 215 and the models 221, 222, 223, 224, and 225 are of particular use in high time-latency applications, such as heating, air conditioning and ventilation of building spaces. Since it takes a significant time to heat, cool or otherwise condition a space, the system anticipates the occupant's future behavior based on their previously detected behavioral pattern, embodied in the models 221, though 225. So, in a non-limiting example, if the system detects that a teenager has entered a home or is about to enter the home, it will condition his or her room in addition to the common areas of the home. Similarly, if the homeowner presence is detected or anticipated in the near future, the master bedroom may be conditioned. In general, the system distinguishes different behavioral patterns of different occupants and anticipates their needs in advance if their presence in the building is detected, or expected at a given time.

Each one of the models 221 through 225 may include both spatial preferences as well as timing schedules for each occupant. Additionally, wider behavioral patterns may be learned and stored, such as a likelihood of entering one room after a sequence of other rooms in the building are visited by the person associated with the model. All of these parameters may be used by the behavioral model manager 215 and the system to make conditioning or other output actuation decisions.

One of the features of the system is the ability to model physical position of the sensors with respect to one another. The system gradually builds a building spatial model 217 of where the sensors are located based on the data from the sensors. In one, non-limiting embodiment, the system may determine that a single sound source, such as a human voice, animal or household sound (such as water flowing from a faucet, etc.) is heard by two different occupancy sensors with varying degree of fidelity or at a different volume. Based on the relative difference of the reception of the sound, the system calculates relative distance of the two sensors. By performing similar analysis on all occupancy sensors, the system can determine relative position of each sensor with respect to the other sensors and thus build a sophisticated spatial model of sensor positions in the building. Similarly, the calculation can be done based on the motion sensing a person walking through the house, or the detection of light source at night. This particular aspect of the invention is utilized during the system installation in the configuration process.

While presented delineation of the functions of the system 201 into its subcomponents 211, 212, 213, 214, 215, 216, 217 and 220 is intended to highlight the best mode of practicing the invention, it is understood that the functions outlined in each component can be implemented in other components. The invention thus makes no restriction on actual implementation of the system of equivalent functionality.

To interact with occupants, the system utilizes various user interfaces. There are two main types of system's user interfaces. One is a physical user interface, such as a control panel, which can be co-shared with a thermostat, alarm or entertainment system, or any other home device equipped with the user interface. The physical user interface can include a touch panel and interact with the user by visual feedback and the user's touch panel presses, or it can be embodied as a set of microphones and speakers reacting to the voice commands from the user, or a combination of both of these physical user interface types.

The second type is a virtual user interface that serves as a conduit to the system. Non-limiting examples of the second type of user interface are any web browser-equipped devices, such as smartphones, computers, laptops, tablets, etc. It is through these devices that a human interacts with the system. These devices serve as conduits to connect the system with the human responsible for the control of the building, or knowledgeable about its state. For brevity, we will refer to all types of user interfaces, be it physical, or virtual ones, as a user interface.

There are many ways to detect human presence in a room. For brevity, we will refer to all devices capable of detecting human presence as occupancy detectors. The most commonly used occupancy detector is the occupancy sensor. Other detection devices include TV remotes, water faucets, intelligent user interfaces, light switches, etc. The intelligent user interfaces can be dedicated user interfaces associated with the system, such as a touch panel, or a virtual user interface connected to the system, or shared intelligent user interfaces associated with other building devices. Examples of intelligent user interfaces include oven, stove, microwave and refrigerator user interfaces, any kind of entertainment system interface, any phones, computers, radios or TVs. The intelligent user interfaces can be stationary or mobile. They can be wired into other devices or building appliances, or they could be wireless. The intelligent user interfaces are devices that require human interaction and cannot be easily interacted with by a series of random presses or other random actions.

Occupancy sensors usually are equipped with passive infra-red detection sensors, ultrasonic sensors, audio-frequency microphones, etc. These sensors can be embedded into ceilings or walls. They can be standalone appliances, or can be mounted inside of other appliances, such as lamps or ceiling fans, or wall-mounted light switches. While the invention makes use of any type of existing occupancy sensors, the sensors with the lowest cost of installation and maintenance are of particular benefit.

One category of such low installation and maintenance cost sensors are battery operated, wireless sensors. These sensors are designed to utilize as little power as possible, spending almost all of the time in the low power mode and only waking up to the full power mode when a specific event happens. The two types of specific events that are most commonly utilized are change in sensor status and timeout. It is only upon wake up caused by one of the trigger events that the sensor communicates with the rest of the system, making the communication potentially very infrequent. Typically, a battery-powered wireless sensor that detects no movement in its coverage area may only wake up on a timeout, such timeout being set to be as infrequent as possible, while allowing the system to keep accurate account of the sensor's remaining battery life. By the way of a non-limiting example, such timeout may be set to 24, 48, 72 or 168 hours. The timeout may also be adjusted by the system, based on detected behavior patterns in the other parts of the building.

Another category of low installation and maintenance cost occupancy sensors are wireless sensors that are not battery operated. These sensors communicate with the system wirelessly, but are powered from a wired source, such as the electric wiring of the house. They usually are wired into other appliances, such as wall switches, ceiling and wall lamps, etc.

A down-side to having wireless occupancy sensors may be the system's limited ability to communicate with them. This is especially true for the battery-powered sensors, but can also be true of any non-battery powered sensor, as these sensors usually take advantage of the same mode of communication, sharing the same radio frequency circuit designs and communicating at the same frequencies. When many sensors are present in a limited space, communication with these sensors is further restricted, to prevent one from interfering with the rest of them.

In general, the use of wireless sensors, results in a slower rate of communication compared to wired systems. This can cause the building occupancy system to take longer time to learn behavioral patterns of its occupants, as slower rate of acquiring data, means slower rate of learning about the building inhabitants.

To overcome the potentially long learning time of the system with wireless occupancy sensors, another feature of the system is the ability to quickly configure them. The sensors are optionally equipped with a switch or a number of switches that allow for quick selection of the sensor configuration, as shown in FIG. 3.

The physical sensor 301 is equipped with two areas—one, 311 for the selection of the space where the sensor is mounted in, and, optionally, the second one 312 to identify the space as an exit or entry point to the building. In the area selection space 311 there is a selection switch 321 allowing the user to quickly select where the type of room or building area the sensor is placed. In the second area 312, there exists a switch 322 allowing the installer to quickly designate the room or building area where the sensor is mounted as an entry or exit point to the building.

It is understood that the area or room selection choice can be significantly expanded and for a residential building application it can include any or all of the following: garage, utility room, media room, hallway, office, laundry room, storage, etc. For the commercial building application, the similar selection choice can include any or all of the following: office, hallway, laboratory, storage, utility room, conference room, bathroom, etc.

Configuring physical switches during an installation is an error-prone process, especially in large buildings with many sensors. Thus it is another feature of the system that the physical configuration of the sensors may be only used as an initial input to the system. Specifically, the system can override the selection made at the sensor, if it determines that the switches were set incorrectly.

Specifically, when an entry/exit point is determined to be near a sensor and the same sensor is not selected to at the entry/exit point of the building; the controller makes the logical correction in the status of the sensor. Other corrections to the system configuration are allowed.

To further help speed up the self learning process of the system, the system is optionally equipped with a commissioning mode. The commissioning mode is a special mode that the system and its sensors are put in to allow it to quickly configure the building spatial model 217, the sensor configuration database 216 and the building occupants' behavioral model 215.

FIG. 4 shows the commissioning process 400. The process starts at step 401, moving to step 402 in which the system is put into the commissioning mode. The system is put in the commissioning mode by the user installing or reconfiguring the system. There are many possible ways of putting the system in the commissioning mode. It can be done by pressing a combination of buttons on a system user interface, or on system devices. It can be done by use of specific voice commands or by sending a message to the system from any device coupled to the system via a communications link, either wired or wireless. Putting the system into the commissioning mode may involve action at the system level only, such as pressing a commissioning start button on a user interface's touch panel, or it may require interaction with individual system components. The later may be particularly needed when dealing with battery operated devices that only sense lack of occupancy at specific timing intervals, spending most of their time in the sleep mode and not communicating with the system.

In the step 403 the system is configured. There are several possible configuration procedures. One of the procedures involves walking around the building from one sensor to the next throughout the entire building section that is being commissioned. While walking through the building the pattern of sensor activation is used to determine the spatial model of where these sensors are. The sensor database is also updated to include all sensors that are able to communicate with the system during commissioning and to potentially remove all previously known sensors from the database if they are not activated during the commissioning. This allows the installer to subtract the sensors from the system without generating any unwanted system level warnings or alarms.

When dealing with the battery operated devices, it may be beneficial to manually actuate them when present in the room they are configured to sense occupancy in. The manual actuation may involve pressing a button on the sensor, shining a light at the sensor, or sounding a particular sound when directly next to the sensor.

It is preferred, but not required, that a single person conducts the walk to simplify the commissioning algorithm and improve its reliability. While walking, the person may play a specific set of sounds emitting from a device with the knowledge of the system. The detection sensors may be equipped with microphones that recognize the sound pattern and are able to calculate a measure of the distance to sound source. They may be further equipped to relay this measure of distance at different times to the building system controller to further aid in the system commissioning. This device used to emit the sounds could be a simple music player, mp3 player, or a smart phone or any other computing device (smart device) running a dedicated application (or microprocessor/microcontroller code) used to commission the system. The application may have a detailed knowledge of the system components and it may be playing a specific set of sounds designed to actuate the sensors. The device may also be emitting a special pattern of light, determined by different light levels and flashing pattern and frequency, to further aid in the occupancy sensor identification.

Furthermore, the smart device may be in communication with the system throughout the walk and it may present the user with information to confirm while conducting the walk. For example, when a presence is detected close to the specific sensor, the smart device's user interface, effectively acting as the system's user interface, may prompt the installer to select a location he/she is currently in and confirm adjacent locations. It may further ask the installer for an identification of the sensor in the room, such as its label or serial number. It may also ask the installer to confirm a light blinking pattern of the sensor in the room.

In case of a walk, the commissioning may end with another user interface interaction, such as a press of a button on the user interface, or a specific voice command issued to the system.

Another mode of configuring the system does not require walking around the building and relies only on the communication links between the sensors and the rest of the system. In this embodiment, the system and or the sensors rely on the strength of the signal received from other wirelessly transmitting devices to triangulate system components' positions. In case of devices coupled via wired communication, the identification is done based on the subnet information from neighboring system components residing on the same network subnet.

Yet another feature of the system is the ability to aid in the creation and configuration of the behavioral model manager 215 and particular building occupants' profiles 221 through 225 during the commissioning process. This is done by informing the system of particular characteristics of each occupant, such as their voice pattern, building alarm code, etc. The system learns the initial pattern of building occupants voice during the commissioning process and it refines it as the time goes on and more data is automatically collected on each building occupant. During the commissioning, the system may prompt each available building occupant to speak a phrase, which the system stores and uses in the future to aid in voice pattern recognition. Such profile updates are possible during the entire life of the system.

Similarly, a system, when integrated with the building automatic entry system (e.g. using radio frequency passive entry cards or an alarm system requiring a code) may identify the person entering the building based on the data from the entry system positively identifying a building occupant.

The building occupants' profiles are set up independently from the sensor and spatial model configurations. Their configuration can be done at another time, or together with the sensor and spatial model configurations. The two features of the commissioning process are independent of each other.

After the entire system is finished commissioning, the method 400 proceeds to step 404. When the system has confirmed the exit from commissioning mode, the method further proceeds to step 405 where it ends.

The commissioning mode is normally subject to a timeout, after which the system can no longer be commissioned without restarting the whole process from the beginning step 401.

There are different communication schemes that can be deployed in the disclosed system. The most cost-effective are modes that use wireless communication in unlicensed spectrum bands. The wireless communication modes differ from one another in many aspects, such as the modulation, coding scheme, bandwidth, allowed radiated power, range, frequency band and frequency bandwidth used, etc. All of these factors affect quality of communication and its long and short-term reliability. Most of today's systems take advantage of freely available frequency bands, such as the 2.4 GHz band used worldwide and known in the United States as one of the ISM bands. Other bands commonly used in wireless building communications are the sub-1 GHz bands, such as the 900 MHz ISM band in the United States. These two ISM bands have the advantage of common usage and therefore low component cost and they normally suffice for short range indoor communication. They do often require more sophisticated encoding schemes to ensure reliability. These encoding schemes often require wider spectral density and thus more transmission power.

Since, given constant transmission power, the range of the wireless transmission is inversely proportional to the carrier frequency; the 900 MHz ISM band has a range advantage over the 2.4 GHz band. This advantage is further compounded by its superior through-wall propagation properties, so its use is normally preferred over 2.4 GHz. There are however even better frequencies available for wireless communication, specifically sub-700 MHz bands are available, but their use in the United States is restricted to low communication duty cycle applications. The best overall frequency to use in the US and worldwide is in the TV White Spectrum band. That band offers the best propagation properties, normally carries no restrictions on the communications duty cycle and is wide enough to accommodate many sub-channels and robust modulation schemes. Its few drawbacks include lack of proper spectrum management rules, and lack of spectral availability in some of the metropolitan areas where majority of population lives. However, in the areas where these drawbacks can be overcome, it is the preferred frequency band of operation for the building management systems.

Moving on to FIG. 5 that represents a method 501 of manufacturing a building management controller. The method begins at step 511 and proceeds to the step 512 of actual physical manufacturing of the device that is to be used in a building. The method then continues to step 513 of programming into the device the building management controller of the disclosure. After the step 513, the method terminates at the step 514.

Those skilled in the art to which this application relates will appreciate that other and further additions, deletions, substitutions and modifications may be made to the described embodiments.

I claim:

1. A communicating system for controlling building conditioning systems in a building having a plurality of rooms with a plurality of entry points, comprising:
   at least one occupancy detector located within the building;
   a system controller associated with the building, the system controller including a non-volatile memory equipped communication-enabled device having a building management controller, the building management controller being equipped to store thereat an automatically generated building spatial model, a sensor configuration database, and a building occupant's behavioral model;
   the sensor configuration database including state data of a plurality of occupancy sensors relative to the occupancy of the building by occupants, the at least one occupancy detector being one of the plurality of occupancy sensors;
   the building occupant's behavioral model including a database of behavioral models of the occupants; and
   at least one system output actuator located in the building in communication with the building conditioning systems;
   the device receiving a plurality of sensor signals, each of the plurality of sensors signals originating from a respective plurality of sensors located within the building, the plurality of occupancy sensors forming a subset of the plurality of sensors;
   the system learning the plurality of entry points of the building based on the relative difference associated with the multiple sensor signals and a detected occupancy pattern within the building occupant's behavior model;
   the system generating the building occupant's behavior model based on room type by pattern recognition of activities of occupants based on time and location data received from the plurality of sensors; and
   the system actuating conditioning in the building by sending signals in anticipation of an occupant's behavior as derived by the building occupant's behavior model.

2. The system as recited in claim 1, wherein the system learns the entry point of a building based on a selection made on an occupancy sensor.

3. The system as recited in claim 1, further learning where bedrooms are based on a detected occupancy pattern of activity in the evening and in the morning.

4. The system as recited in claim 1, wherein the system output actuator is a heating, ventilation and air conditioning controller.

5. The system as recited in claim 4, wherein the system controller controls at least two dampers affecting conditioned air flow to different parts of the building.

6. The system as recited in claim 4, wherein the controller allows for different settings of comfort for pets than for humans.

7. The system as recited in claim 1, wherein said system generates and stores profiles for building occupants.

8. The system as recited in claim 7, wherein the profiles of building occupants are presented to occupants via a user interface.

9. The system as recited in claim 7, wherein the profiles of building occupants are used to actuate system outputs in anticipation of occupant behavior.

10. The system as recited in claim 7, wherein the profiles of building occupants are associated with the occupants' voices during system commissioning.

11. The system as recited in claim 9, where the system outputs control a heating, ventilation and air conditioning system.

12. The system as recited in claim 9, where the presence of a person in the building is determined based on the status of the person's cellular phone connection to the building's wireless network.

13. The system as recited in claim 1, where a relative position of sensors is calculated in a system's building spatial model.

14. The system as recited in claim 1, where a communication mode includes wireless communication over the TV White Spectrum bands.

15. The system as recited in claim 1, further comprising:
based on the relative difference associated with multiple sensor signals of the plurality of sensor signals, the system calculating the relative three-dimensional position of each sensor of the plurality of sensors with respect to the plurality of sensors;
the system informing the building spatial model of the relative positions of the sensors, thereby creating a three-dimensional spatial model of the building which utilizes different patterns of occupancy and an identification of the plurality of entry points to determine the room type of each of the plurality of rooms; and
the system learning the plurality of rooms of the building based on the detected occupancy pattern.

16. A method of deploying a building management controller for a building having a plurality of rooms with a plurality of entry points, comprising:
manufacturing a non-volatile memory equipped, communication-enabled device;
programming said device to include therein the building management controller, where the building management controller is equipped to store thereat an automatically generated building spatial model, a sensor configuration database, and a building occupant's behavioral model, the sensor configuration database including state and location data of a plurality of occupancy sensors relative to the occupancy of the building by occupants, the building occupant's behavioral model including a database of behavioral models of the occupants;
receiving at the device, a plurality of sensor signals, each of the plurality of sensors signals originating from a respective plurality of sensors located within the building, the plurality of occupancy sensors forming a subset of the plurality of sensors;
based on the relative difference associated with multiple sensor signals of the plurality of sensor signals, calculating the relative position of each sensor of the plurality of sensors with respect to the plurality of sensors;
informing the building spatial model of the relative positions of the sensors, thereby creating a three-dimensional spatial model of the building which utilizes different patterns of occupancy and an identification of the plurality of entry points to determine the room type of each of the plurality of rooms; and
generating the building occupant's behavior model based on room type at the device by pattern recognition of activities of occupants based on time and location data received from the plurality of sensors.

17. The method as recited in claim 16, further comprising:
actuating conditioning in the building by sending signals in anticipation of an occupant's behavior as derived by the building occupant's behavior model.

18. A method of installing a building management system in a building having a plurality of rooms with a plurality of entry points, comprising:
providing a non-volatile memory equipped communication-enabled device including a building management controller in the building, the building management controller being equipped to store thereat an automatically generated building spatial model, a sensor configuration database, and a building occupant's behavioral model, the sensor configuration database including state and location data of a plurality of occupancy sensors relative to the occupancy of the building by occupants, the building occupant's behavioral model including a database of behavioral models of the occupants;
powering up the building management controller; and
putting the system into commissioning mode via a system's user interface;
configuring the building spatial model while an individual intentionally walks through the entirety of the building for the purpose of the commissioning mode by receiving a plurality of sensor signals, each of the plurality of sensors signals originating from a respective plurality of sensors located within the building, the plurality of occupancy sensors forming a subset of the plurality of sensors;
based on the relative difference associated with multiple sensor signals of the plurality of sensor signals, calculating the relative position of each sensor of the plurality of sensors with respect to the plurality of sensors;
informing the building spatial model of the relative positions of the sensors, thereby creating a three-dimensional spatial model of the building which utilizes different patterns of occupancy and an identification of the plurality of entry points to determine the room type of each of the plurality of rooms; and
finishing the commissioning mode.

19. The method as recited in claim 18, further comprising utilizing by the walking individual, a smart device to confirm the location of a sensor of the plurality of sensors.

20. The method as recited in claim 18, further comprising utilizing by the walking individual, a sound device to emit a specific pattern of sounds used to configure the system.

21. The method as recited in claim 18, further comprising utilizing by the walking individual, a light device to emit a specific pattern of light used to configure the system.

22. The method as recited in claim 18, further comprising, manually actuating occupancy detectors in the building, the detectors forming a portion of the plurality of sensors.

23. The method as recited in claim 22, where manual actuation involves touching the detectors.

24. The method as recited in claim 22, where manual actuation involves shining a light at the detectors.

25. A method to use a smart device application in installation of a building management system in a building having a plurality of rooms with a plurality of entry points, said method comprising:
providing a non-volatile memory equipped communication-enabled device including a building management controller in the building, the building management controller being equipped to store thereat an automatically generated building spatial model, a sensor configuration database, and a building occupant's behavioral model, the sensor configuration database including state and location data of a plurality of occupancy sensors relative to the occupancy of the building by occupants, the building occupant's behavioral model including a database of behavioral models of the occupants;
putting the system in commissioning mode; and
directing an individual to walk through the building with a smart device running said smart device application;
configuring the building spatial model while an individual intentionally walks through the entirety of the building for the purpose of the commissioning mode by receiving at the device, a plurality of sensor signals, each of the plurality of sensors signals originating from a respective plurality of sensors located within the building, the plurality of occupancy sensors forming a subset of the plurality of sensors;

based on the relative difference associated with multiple sensor signals of the plurality of sensor signals, calculating the relative position of each sensor of the plurality of sensors with respect to the plurality of sensors; and informing the building spatial model of the relative positions of the sensors, thereby creating a three-dimensional spatial model of the building which utilizes different patterns of occupancy and an identification of the plurality of entry points to determine the room type of each of the plurality of rooms.

26. The method to use smart device application as recited in claim 25 where said smart device application is further designed to emit a specific sequence of sounds during system commissioning.

27. The method to use smart device application as recited in claim 25 where said smart device application is further designed to confirm a sensor location.

28. The method to use smart device application as recited in claim 25, where said smart device application is further designed to ask for and retrieve building occupant's voice sample.

* * * * *